United States Patent
Huang et al.

(10) Patent No.: US 8,903,233 B1
(45) Date of Patent: Dec. 2, 2014

(54) AUTO-FOCUS SYSTEM USING MULTIPLE LENSES AND METHOD THEREOF

(71) Applicant: Altek Semiconductor Corporation, Hsinchu (TW)

(72) Inventors: Yu-Chen Huang, Hsinchu County (TW); Wen-Yan Chang, Miaoli County (TW); Chung-Chia Kang, Tainan (TW)

(73) Assignee: Altek Semiconductor Corporation, Hsinchu (TW)

( * ) Notice: Subject to any disclaimer, the term of this patent is extended or adjusted under 35 U.S.C. 154(b) by 0 days.

(21) Appl. No.: 14/299,088

(22) Filed: Jun. 9, 2014

(30) Foreign Application Priority Data

Apr. 30, 2014 (TW) ............................. 103115509 A (51) Int. Cl.
*G03B 13/36* (2006.01)

(52) U.S. Cl.
USPC ........... 396/104; 396/121; 396/125; 396/127; 396/133

(58) Field of Classification Search
USPC .......... 396/104, 121, 125, 127, 133; 348/349, 348/353
See application file for complete search history.

(56) References Cited

U.S. PATENT DOCUMENTS

| | | | | |
|---|---|---|---|---|
| 5,597,999 A * | 1/1997 | Kinba et al. | ............... | 250/201.7 |
| 8,558,943 B2 * | 10/2013 | Stavely et al. | ............... | 348/353 |
| 8,718,459 B2 * | 5/2014 | Hsu | ............................... | 396/121 |
| 8,724,982 B2 * | 5/2014 | Ishiwata et al. | ............... | 396/104 |
| 8,836,767 B2 * | 9/2014 | Endo | ............................... | 348/47 |
| 2003/0160886 A1 * | 8/2003 | Misawa et al. | ................ | 348/347 |
| 2008/0159727 A1 * | 7/2008 | Hamamura et al. | .......... | 396/104 |
| 2008/0219654 A1 * | 9/2008 | Border et al. | .................... | 396/89 |
| 2009/0175610 A1 * | 7/2009 | Yeh | ............................... | 396/127 |
| 2011/0150446 A1 * | 6/2011 | Song | ............................... | 396/90 |
| 2011/0234768 A1 * | 9/2011 | Pan | ............................... | 348/47 |
| 2012/0154670 A1 * | 6/2012 | Hamamura | ................... | 348/353 |

* cited by examiner

*Primary Examiner* — W B Perkey (74) *Attorney, Agent, or Firm* — Bacon & Thomas, PLLC (57) ABSTRACT

The present disclosure illustrates an auto-focus system using multiple lenses and method thereof. The system is characterized in using multiple lenses and combining a focus depth based approach and a contrast value based approach to improve focus speed and precision. In particular, the system can avoid the impairment caused by the repeat pattern in the focus depth based approach.

10 Claims, 8 Drawing Sheets

AUTO-FOCUS SYSTEM USING MULTIPLE LENSES AND METHOD THEREOF

CROSS-REFERENCE TO RELATED APPLICATION

This application claims the benefit of Taiwan Patent Application No. 103115509, filed on Apr. 30, 2014, in the Taiwan Intellectual Property Office, the disclosure of which is incorporated herein in its entirety by reference.

BACKGROUND OF THE INVENTION

1. Field of the Invention

The present disclosure relates to an auto-focus system, more particularly to an auto-focus system using multiple lenses to improve speed and precision of the focusing.

2. Description of the Related Art

Generally speaking, the auto-focus function is one of importance functions of the current camera, such as digital still camera or digital camcorder. By the auto-focus function, user can get the focus length of the lens set of the camera quickly, so that the success rate of shooting picture and quality of the picture can be improved. In addition, the auto-focus function can also correctly track the quickly moving object, to lower the threshold of photograph.

In prior art, the basic operation of the auto-focus function is to automatically control the movement of at least one optical lens elements of the lens of the camera system to enable the object to be clearly imaged on the image sensor unit of the camera system. To capture the images of the objects locate at different positions or different depths, the at least one optical lens elements must be moved to different focus positions repeatedly. Therefore, the focus speed of the auto-focus function is an importance factor affecting the user experience. Many companies often highlight the function of quick focus to promote their products.

Common auto-focusing approaches are classified into a two dimensional focusing and a three dimensional focusing. In operation of the two dimensional focusing, the at least one optical lens element of the lens is moved for many times and then the focus status of the lens is determined according to the clear degree of the image received in the image sensor unit after each movement of the at least one optical lens element. Generally speaking, when the lens does not converge well, the image formed on the image sensor unit is blurring and the contrast value of the image is lower. Therefore, a focus area can be assigned in advance, and a contrast value in the focus area of the image received in the image sensor unit is calculated by image process after each movement of the at least one optical lens element. The contrast value can indicate the clear degree of the image. After multiple contrast values are obtained, a contrast value curve can be estimated according to these contrast values, and the position corresponding to the maximum value in the contrast value curve can be defined as the focus position, and the at least one optical lens element is moved to the focus position for completing the focusing.

Other focusing approach is a three dimensional focusing. When the camera has two sets of the lens and the image sensor unit, the camera can generate two images at the same time, and a depth of the object within the two images can be calculated according to the two images. The depth indicates a distance between the camera and the object. At least one of the two lenses is moved to a position corresponding to the depth, so the focusing is completed.

The two dimensional focusing requires moving the optical lens element for many times to obtain multiple contrast values, which results in longer focus time. Compared with the two dimensional focusing, the three dimensional focusing just calculates the depth of the object one time to complete the focusing, and the focus time of the three dimensional focusing is about one tenth of the focus time of the two dimensional focusing, so the three dimensional focusing has advantage of high focus speed.

However, the three dimensional focusing has a drawback that the depth calculation fails easily if a repeated pattern appears in the focus area of the image, and the wrong depth usually causes the failure of focusing.

Therefore, what is need is an auto-focus system which has the advantage of the high focus speed in the three dimensional focusing and also can prevent from the failure of focusing when the repeated pattern appears.

SUMMARY OF THE INVENTION

To solve the above-mentioned problems, one of objectives of the present disclosure is to provide an auto-focus system using multiple lenses and method thereof, to improve the speed and the accuracy of the focusing.

The other objective of the present disclosure is to provide an auto-focus system using multiple lenses and method thereof, to prevent the accuracy of the focusing from being impaired by the repeated pattern.

Another objective of the present disclosure is to provide an auto-focus system using multiple lenses and method thereof, to use multiple lenses to solve the drawback in traditional focusing.

An exemplary embodiment of the present disclosure provides an auto-focus system using multiple lenses which is adapted for an image capture device having a first lens, a second lens, a first lens driving module and a second lens driving module. The auto-focus system comprises a repeated pattern detection module, a first focus module, and a second focus module. The repeated pattern detection module receives a first image and a second image from the first lens and the second lens, respectively, and detects whether a repeated pattern appears in a preset focus area of the first image and the second image. When the repeated pattern detection module judges that the repeated pattern does not appear, the first focus module calculates a focus depth according to the first image and the second image, and controls the first lens driving module and the second lens driving module to drive movement of the first lens and the second lens for focusing. When the repeated pattern detection module judges that the repeated pattern appears, the second focus module drives the first lens or the second lens to move for many times and calculates contrast values of the first image or the second image captured after each of movements, and controls the first lens driving module and the second lens driving module to drive movements of the first lens and the second lens for focusing according to the calculated contrast values.

Preferably, the preset focus area is located at the central area of the first image and the second image.

Preferably, the second focus module generates a contrast value curve according to the plurality of contrast values, and uses a position corresponding to the maximum value in the contrast value curve as a focus position, and drives the first lens and the second lens to move to the focus position for focusing.

An exemplary embodiment of the present disclosure provides an auto-focus system using multiple lenses which is adapted for an image capture device having a first lens, a second lens, a first lens driving module and a second lens driving module. The auto-focus system comprises a depth calculation module and a focus control module. The depth calculation module receives a first image and a second image from the first lens and the second lens, respectively, and calculates a focus depth or a plurality of candidate depths according to a preset focus area in the first image and the second image. The focus control module is electrically connected with the depth calculation module. When the depth calculation module outputs the focus depth, the focus control module activates the first lens driving module and the second lens driving module to respectively control the first lens and the second lens to move to a position corresponding to the focus depth. When the depth calculation module outputs the plurality of candidate depths, the focus control module respectively controls the first lens driving module and the second lens driving module to drive the first lens or the second lens to move to a plurality of candidate focus positions corresponding to the plurality of candidate depths, and the focus control module respectively obtains a plurality of contrast values, and according to the contrast values drives movements of the first lens and the second lens for focusing.

Preferably, the preset focus area is located at the central area of the first image and the second image.

Preferably, the depth calculation module generates the plurality of candidate depths firstly, and each of the candidate depths has a reliability value, and the depth calculation module determines the focus depth from the candidate depths according to a reliability judgment condition.

Preferably, when the depth calculation module cannot determine the focus depth according to the reliability judgment condition, the depth calculation module outputs the candidate depths.

An exemplary embodiment of the present disclosure provides an auto-focus method using multiple lenses which is adapted for an image capture device having a first lens, a second lens, a first lens driving module and a second lens driving module. The auto-focus method comprises following steps: using the first lens and the second lens to capture a first image and a second image, respectively; judging whether a repeated pattern appears in a preset focus area of the first image and the second image; calculating a focus depth according to the first image and the second image and respectively controlling the first lens driving module and the second lens driving module to drive movement of the first lens and the second lens for focusing when it is judged that the repeated pattern does not appear; driving the first lens or the second lens to move for many times and calculating contrast values of the first image or the second image captured after each of movements, and according to the calculated contrast values respectively controlling the first lens driving module and the second lens driving module to drive movements of the first lens and the second lens for focusing when it is judged that the repeated pattern appears.

Preferably, the preset focus area is located at the central area of the first image and the second image.

Preferably, when it is judged that the repeated pattern appears, the auto-focus method of the present disclosure further comprises steps of generating a contrast value curve according to the contrast values, and using a position corresponding to the maximum value in the contrast value curve as a focus position; and driving the first lens and the second lens to move to the focus position for focusing.

An exemplary embodiment of the present disclosure provides an auto-focus method using multiple lenses which is adapted for an image capture device having a first lens, a second lens, a first lens driving module and a second lens driving module. The auto-focus method comprises following steps: using the first lens and the second lens to capture a first image and a second image, respectively; generating a plurality of candidate depths according to a preset focus area of the first image and the second image, each candidate depth having a reliability value; determining a focus depth from the candidate depths according to a reliability judgment condition and the plurality of reliability values; controlling the first lens driving module and the second lens driving module to respectively drive the first lens and the second lens to move to a position corresponding to the focus depth when the focus depth can be determined; controlling the first lens driving module and the second lens driving module to respectively drive the first lens or the second lens to move to positions corresponding to the candidate depths, and respectively obtaining a plurality of contrast values when the focus depth cannot be determined; driving the first lens and the second lens to move to a position corresponding to the candidate depth having the maximal contrast value in the candidate depths.

Preferably, the preset focus area is located at the central area of the first image and the second image.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Figure 1:
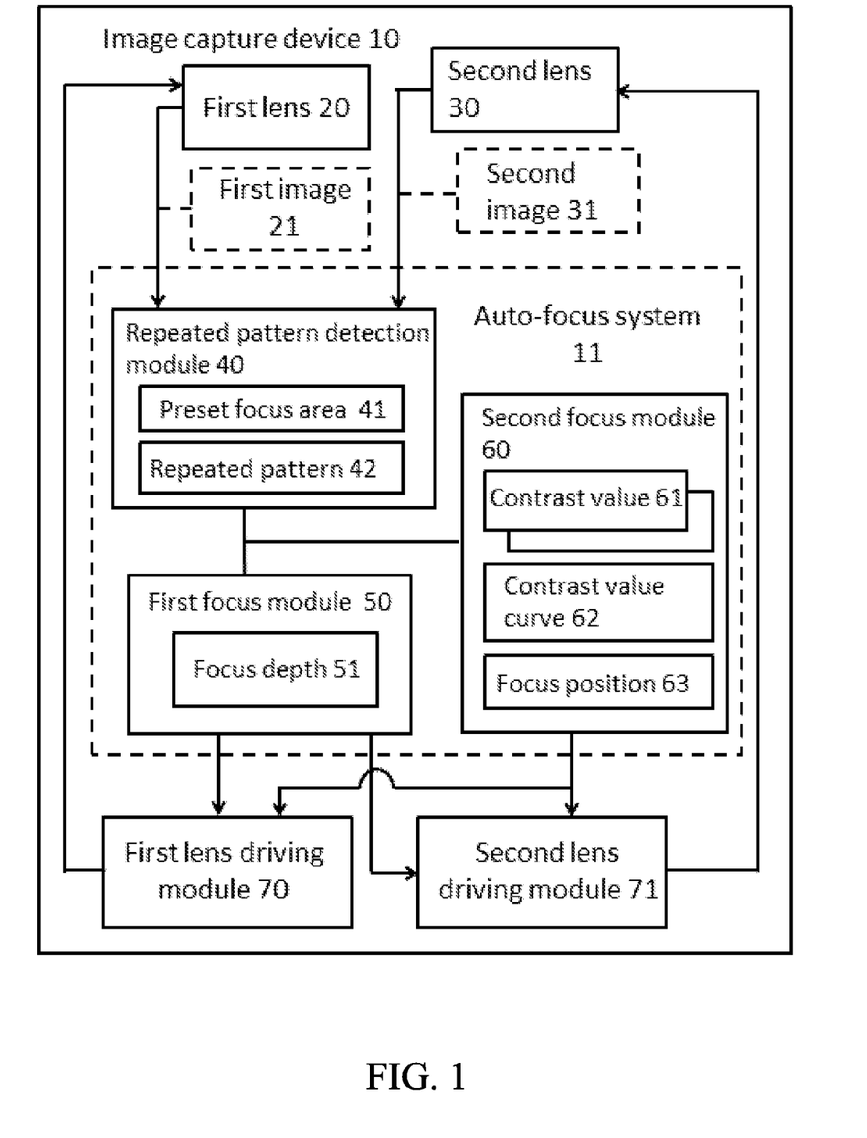
FIG. 1 is a block diagram of a first embodiment of an auto-focus system using multiple lenses of the present disclosure.

Please refer to FIG. 1 which is a block diagram of a first embodiment of an auto-focus system using multiple lenses of the present disclosure. The auto-focus system 11 is adapted for an image capture device 10 having a first lens 20, a second lens 30, a first lens driving module 70, and a second lens driving module 71.

Each of the first lens driving module 70 and the second lens driving module 71 comprises a stepper motor and a driving mechanism connected with the stepper motor and an optic lens group inside the first lens 20 and the second lens 30, so that the optic lens group can be driven to move by controlling the rotation direction and stepping amount of the stepper motor, to change the imaging effect of the optic lens group on the image sensor unit. For convenient illustration, in the below paragraph the driving way is abbreviated that the first lens driving module 70 and the second lens driving module 71 drives movements of the first lens 20 and second lens 30 for focusing, to replace the above detail description of the driving way.

The auto-focus system 11 comprises a repeated pattern detection module 40, a first focus module 50, and a second focus module 60. The first focus module 50 uses a focus depth based approach to perform the focusing, and the second focus module 60 use a contrast value based approach to perform the focusing. Because the two focusing approaches have advantages and drawbacks respectively, the auto-focus system 11 combines the advantages of the two focusing approaches and avoids their drawbacks, to obtain the optimal focusing effect.

The repeated pattern detection module 40 receives a first image 21 and a second image 31 from the first lens 20 and the second lens 30, respectively, and detects whether a repeated pattern 42 appears in a preset focus area 41 of the first image 21 and the second image 31. In implementation, the preset focus area 41 is located at the central area of the first image 21 and the second image 31.

Because the first lens 20 and the second lens 30 are disposed in the different positions on the image capture device 10, the first image 21 and the second image 31 having different view angles can be obtained simultaneously for calculating a depth of a specific object in the two images. The operation of the focusing is to move at least one optical lens element inside the lens to converge the optical signal of the specific object on the image sensor unit, so the image of the specific object can be clear. Therefore, if the focus depth for the specific object can be obtained, the position of the at least one optical lens element corresponding to the focus depth can be evaluated, so that the focusing can be completed by just moving the at least one optical lens element one time and the focus time can be shorten efficiently.

However, if the specific object has a repeated pattern, the depth calculation is easy to fail. Therefore, before the focusing is performed, the repeated pattern detection module 40 judges whether the repeated pattern 42 appears in a preset focus area 41 of the first image 21 and the second image 31 in advance.

When the repeated pattern detection module 40 judges that the repeated pattern 42 does not appears, it indicates that the depth calculation has more precision in this situation and the focus depth based focusing approach can be used. The first focus module 50 calculates the focus depth 51 according to the first image 21 and the second image 31 and respectively controls the first lens driving module 70 and the second lens driving module 71 to drive movement of the first lens 20 and the second lens 30 for the focusing. The technology related to the depth based focusing approach is well known by the skiller in this technology field, so the detail description is omitted.

On the other hand, when the repeated pattern detection module 40 judges that the repeated pattern 42 appears, it indicates that the depth calculation has less precision in this situation and the focusing based on the calculated depth has a risk of failure, so the contrast value based focusing approach is used by the second focus module 60.

Figure 2:
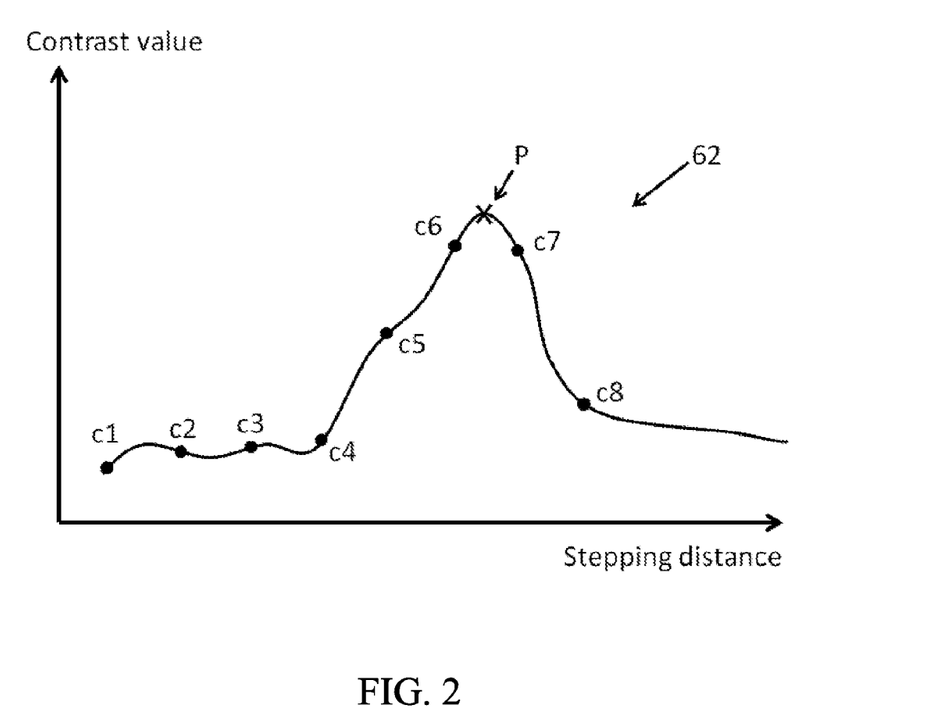
FIG. 2 is a schematic view of a contrast value curve of the present disclosure.

The second focus module 60 drives the first lens 20 or the second lens 30 to move for many times and calculates contrast values 61 of the captured first image 21 or the second image 31 after each of movements. For example, the first lens 20 or the second lens 30 are driven to move for eight times, as shown in FIG. 2, and the eight contrast values 61 are calculated, as the $c1 \sim c8$ shown in FIG. 2. Each contrast value 61 indicates the sharpness and clear degree of the image content, so the position corresponding to the maximum contrast value is usually selected as the focus position 63.

In implementation, the position corresponding to the maximum value within the contrast values $c1 \sim c8$ can be the focus position 63 directly, and it is the position corresponding to the contrast value c6 in this case; alternatively, the second focus module 60 can generate a contrast value curve 62 according to the contrast values 61, the contrast value curve 62 being a multiple degree polynomial in one variable, as shown in FIG. 2. Next, the position corresponding to the peak value of the contrast value curve 62 is used as the focus position 63, which is the position P in FIG. 2.

Therefore, the first lens driving module 70 and the second lens driving module 71 can be controlled to drive the first lens 20 and the second lens 30 to move to the focus position 63 for focusing according to the calculated contrast values 61.

In conclusion, the focusing approach of the second focus module 60 is not impaired by the repeated pattern, so the auto-focus system 11 of the present disclosure can combine the advantages of the two focusing approaches. When the repeated pattern does not appear, the auto-focus system 11 utilizes the depth for quickly focusing. When the repeated pattern appears, the auto-focus system 11 utilizes the contrast value based focusing approach to perform focusing.

Figure 3:
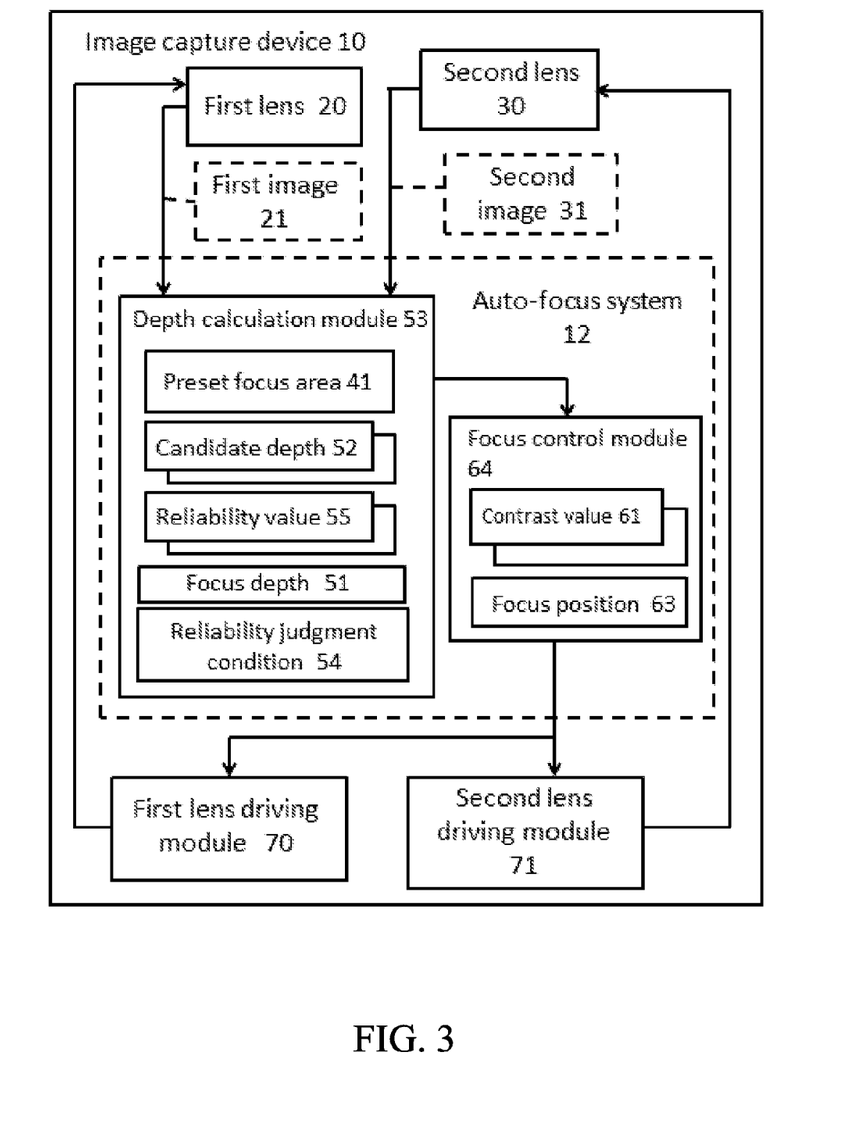
FIG. 3 is a block diagram of a second embodiment of the auto-focus system using multiple lenses of the present disclosure.

Please refer to FIG. 3 which is a block diagram of a second embodiment of the auto-focus system using multiple lenses of the present disclosure. The auto-focus system 12 is adapted for an image capture device 10 having a first lens 20, a second lens 30, a first lens driving module 70, and a second lens driving module 71. The auto-focus system 12 comprises a depth calculation module 53 and a focus control module 64.

The depth calculation module 53 receives a first image and a second image 21 from the first lens 20 and the second lens 30, respectively, and calculates a focus depth 51 or a plurality of candidate depths 52 according to a preset focus area 41 in the first image 21 and the second image 31. In implementation, the preset focus area 41 is located at the central area of the first image 21 and the second image 31.

In implementation, because the image is consisted of multiple pixels, and the depth calculation module 53 uses one pixel or a group of multiple pixels as a unit of calculation, so the depth calculation module 53 generates a plurality of candidate depths 52 for the preset focus area 41 of the first image 21 and the second image 31, and each candidate depth 52 has a reliability value 55.

Higher reliability value 55 indicates the candidate depth 52 is more precise. However, if the maximum value of the all reliability values 55 is not higher than a preset threshold, or multiple higher reliability values 55 of the all reliability values 55 are very close, it is not easy to judge a correct depth for an object in preset focus area 41. Therefore, the depth calculation module 53 determines the focus depth 51 from the candidate depths 52 according to a reliability judgment condition 54. For example, the reliability judgment condition 54 comprises that the candidate depth 52, which is used as the focus depth 51, of which the reliability value 55 must be higher than the preset threshold, and the highest reliability value 55 must be higher than the second higher reliability value 55 by a certain ratio.

However, if the repeated pattern appears in the preset focus area 41 of the first image 21 and the second image 31, it is possible that all reliability values 55 are lower than the preset threshold, or there are multiple highest reliability values 55 and it is not easy to judge which one being correct. Therefore, when the depth calculation module 53 cannot determine the focus depth 51 according to the reliability judgment condition 54, the depth calculation module 53 outputs the candidate depths 52.

The focus control module 64 is connected electrically with the depth calculation module 53. When the depth calculation module 53 outputs the focus depth 51, the focus control module 64 activates the first lens driving module 70 and the second lens driving module 71 to respectively control the first lens 20 and the second lens 30 to move to a position corresponding to the focus depth 51.

When the depth calculation module 53 outputs candidate depths 52, it indicates that other information is required for judging the focus position, so the focus control module 64 controls the first lens driving module 70 and the second lens driving module 71 to respectively drive the first lens 20 or the second lens 30 to move to positions corresponding to the candidate depths, and respectively obtains a plurality of contrast values 61.

The focus position can be determined from the candidate depths 52 due to the repeated pattern, but the calculation of contrast value is not impaired by the repeated pattern, so the focus control module 64 then calculates the contrast values 61 corresponding to the candidate depths 52, respectively, and uses the candidate depth 52 having the maximal contrast value 61 as the focus position 63. Next, the focus control module 64 controls the first lens 20 and the second lens 30 to move to the position corresponding to the focus depth 51 for the focusing.

In conclusion, when the depth calculation module 53 of the auto-focus system 11 of the present disclosure cannot determine the focus depth 51, it indicates that the repeated pattern appears in the image possibly, and the focusing may fail if the focusing is performed according to the depth. Therefore, the auto-focus system 11 of the present disclosure combines the calculation of the contrast value which is not impaired by the repeated pattern to find the better candidate depth 52 from the candidate depths 52 according to the contrast values, so that both of the speed and precision of focusing can be improved.

Figure 4:
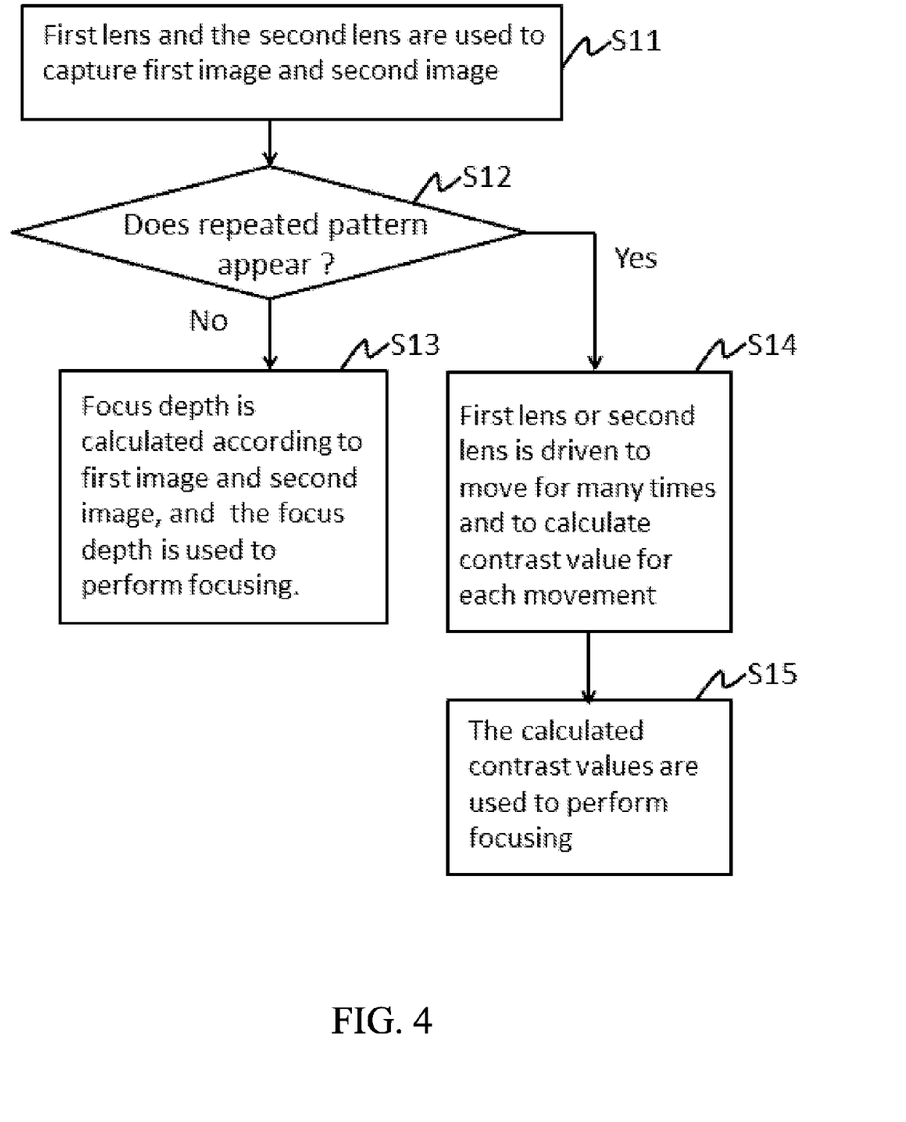
FIG. 4 is a flow diagram of a first embodiment of an auto-focus method using multiple lenses of the present disclosure.

Please refer to FIG. 4 which is a flow diagram of a first embodiment of the auto-focus method using multiple lenses of the present disclosure. The first embodiment is illustrated by cooperating with the auto-focus system 10 of the FIG. 1. The auto-focus method comprises following steps.

In step S11, the first lens 20 and the second lens 30 are used to capture a first image 21 and a second image 31, respectively. In step S12, it is judged whether a repeated pattern 42 appears in a preset focus area 41 of the first image 21 and the second image 31. In implementation, the preset focus area 41 is located at the central area of the first image 21 and the second image 31.

In step S13, when it is judged that the repeated pattern 42 does not appear, a focus depth 51 is calculated according to the first image 21 and the second image 31, and according to the focus depth 51 the first lens driving module 70 and the second lens driving module 71 are respectively controlled to drive movements of the first lens 20 and the second lens 30 for focusing. In step S14, when it is judged that the repeated pattern 42 appears, the first lens 20 or the second lens 30 is driven to move for many times, and after each of movements, contrast values 61 of the first image 21 or the second image 31 captured are calculated. In step S15, according to the calculated contrast values 61, the first lens driving module 70 and the second lens driving module 71 are respectively controlled to drive movements of the first lens 20 and the second lens 30 for focusing.

In implementation, a contrast value curve 62 is generated according to the contrast values, and a position corresponding to the maximum value in the contrast value curve 62 is used as the focus position 63. The first lens 20 and the second lens 30 are driven to move to the focus position 63 for the focusing.

Figure 5:
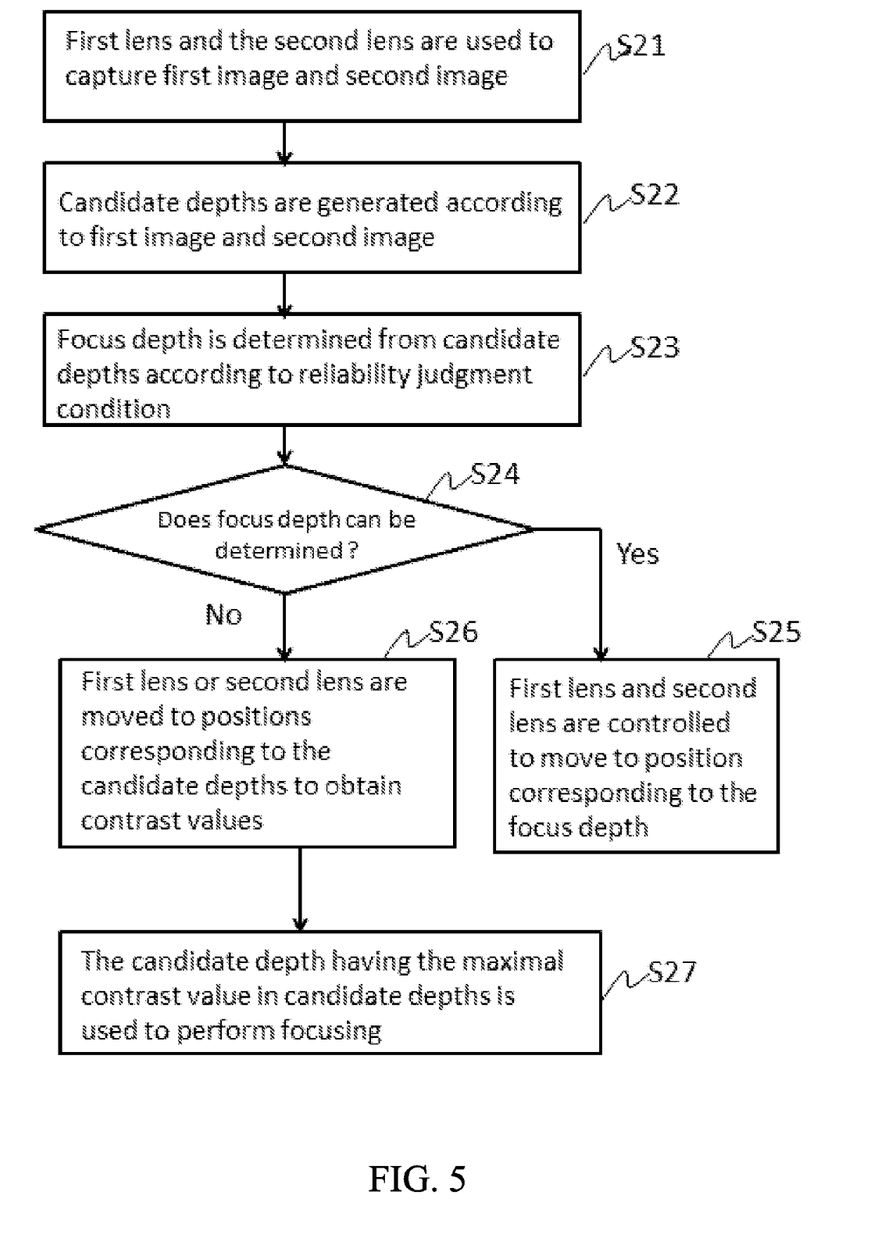
FIG. 5 is a flow diagram of a second embodiment of the auto-focus method using multiple lenses of the present disclosure.

Please refer to FIG. 5 which is a flow diagram of a second embodiment of the auto-focus method using multiple lenses of the present disclosure. The second embodiment is illustrated by cooperating with the auto-focus system of the FIG. 2. The auto-focus method comprises following steps.

In step S21, the first lens 20 and the second lens 30 are used to capture a first image 21 and a second image 31, respectively. In step S22, a plurality of candidate depths 52 are generated according to a preset focus area 41 of the first image 21 and the second image 31. Each candidate depth 52 has a reliability value 55.

In step S23, a focus depth 51 is determined from the candidate depths 52 according to a reliability judgment condition 54 and a plurality of reliability values 55. It is also judged whether the focus depth 51 can be determined in step S23. If the focus depth 51 can be determined, the step S25 is executed to control the first lens driving module 70 and the second lens driving module 71 to respectively drive the first lens 20 and the second lens 30 to move to a position corresponding to the focus depth 51.

When the focus depth 51 cannot be determined, the step S26 is executed to control the first lens driving module 70 and the second lens driving module 71 to respectively drive the first lens 20 or the second lens 30 to move to positions corresponding to the candidate depths 52, and respectively obtain a plurality of contrast values 61.

Next, in step S27, the first lens 20 and the second lens 30 are driven to move to a position corresponding to a candidate depth 52 having the maximal contrast value 61 in the candidate depths 52.

Figure 6:
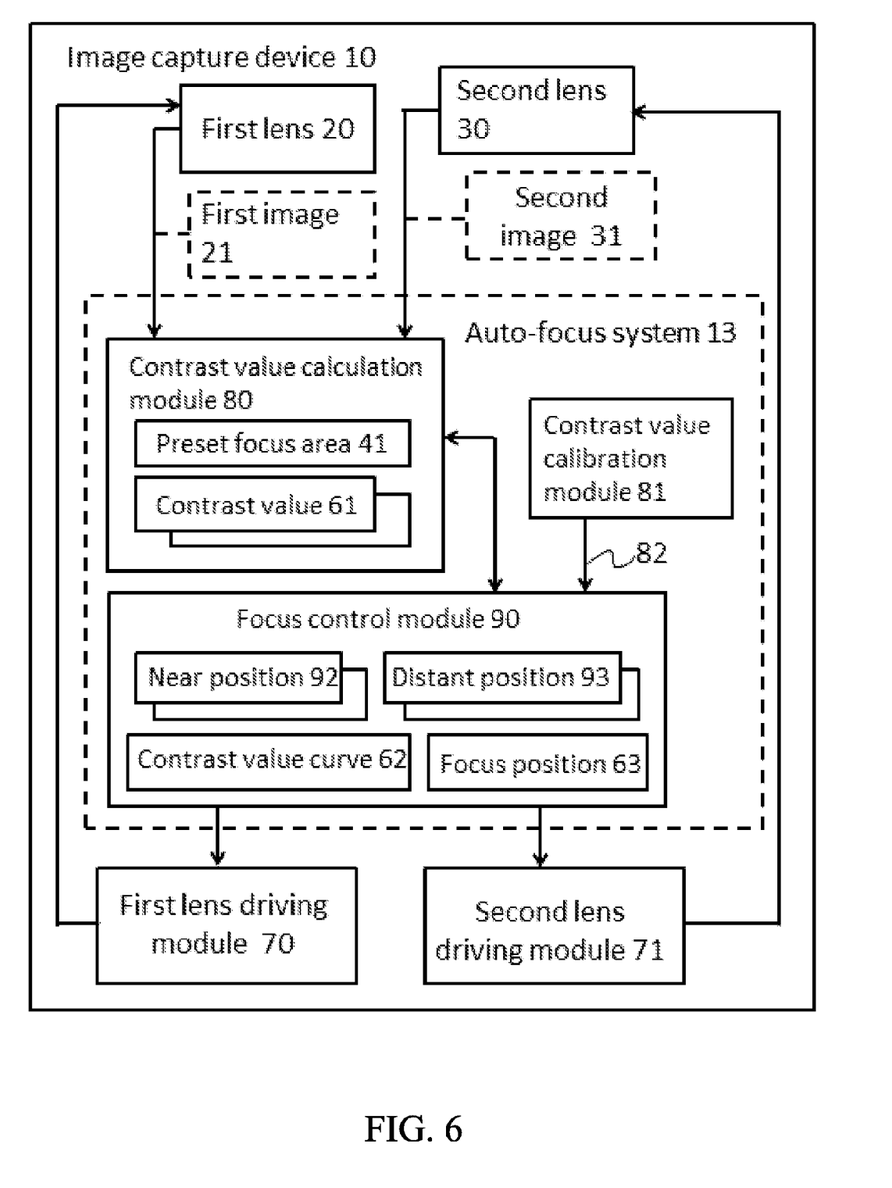
FIG. 6 is a block diagram of a third embodiment of the auto-focus system using multiple lenses of the present disclosure.
Figure 7:
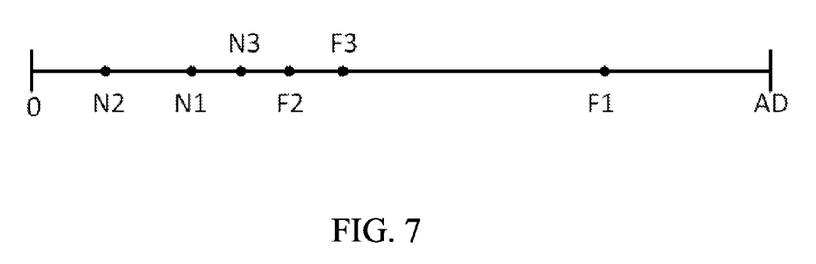
FIG. 7 is a schematic operation view of the third embodiment of the auto-focus system using multiple lenses of the present disclosure.

Please refer to FIG. 6 and FIG. 7. The FIG. 6 is a block diagram of a third embodiment of the auto-focus system using multiple lenses of the present disclosure, and the FIG. 7 is a schematic operation view of the third embodiment of the auto-focus system using multiple lenses of the present disclosure. The auto-focus system 13 is adapted for an image capture device 10 having a first lens 20, a second lens 30, a first lens driving module 70, and a second lens driving module 71. The auto-focus system 13 comprises a contrast value calculation module 80, a focus control module 90, and a contrast value calibration module 81.

The contrast value calculation module 80 calculates contrast values of images captured by the first lens 20 and the second lens 30. The contrast value calibration module 81 generates a contrast value calibration parameter 82 of the first lens 20 or the second lens 30. In implementation, the first lens 20 and the second lens 30 may be different lenses, such as the lenses having different resolutions or different optical characteristics. The focus control module 90 performs the comparison between the contrast values of the images captured by the first lens 20 and second lens 30, in order to maintain correctness of image comparison, the contrast values of the images captured by the first lens 20 and the second lens 30 are normalized by multiplying with the contrast value calibration parameter 82.

The focus control module 90 generates a first set of a near position 92 and a distant position 93, such as the near position N1 and the distant position F1 in FIG. 7 which are a quarter and three quarters of the total lens moving distance AD, respectively. Because the image capture device 10 has two lenses and the contrast value calibration module 81 also provides the contrast value calibration parameter 82, so the two lenses can be operated separately to save the focus time.

The focus control module 90 controls the first lens driving module 70 and the second lens driving module 71, respectively, to drive the first lens 20 and the second lens 30 to move to the near position N1 and the distant position F1, and controls the contrast value calculation module 80 to calculate the first set of the contrast values 61 corresponding to the near position N1 and the distant position F1.

Next, a second set of a near position N2 and a distant position F2 are generated according to the larger one of the first set of contrast values 61, and one of the near position N2 or the distant position F2 in the second set is located between the near position N1 and distant position F1 of the previous set. For example, in FIG. 7, it is assumed that the contrast value corresponding to the near position N1 is larger than the contrast value corresponding to the distant position F1, and it indicates that the possibility of the maximal contrast value near the near position N1 is larger than that of near the distant position F1, so it is determined that the near position N2 and the distant position F2 are located at two sides of the near position N1 and the distant position F2 is located between the near position N1 and the distant position F1. The near position N2 is one eighth of the total lens moving distance AD, and the distant position F2 is three eighths of the total lens moving distance AD.

In the other hand, if the contrast value corresponding to the near position N1 is lower than the contrast value corresponding to the distant position F1, the near position N2 is located between the near position N1 and the distant position F1, and the near position N2 is five eighths of the total lens moving distance AD and the distant position F2 is seven eighths of the total lens moving distance AD.

Next, it is assumed that the contrast value corresponding to the near position N2 is lower than the contrast value corresponding to the distant position F2, so the near position N3 and the distant position F3 are determined to be located at two sides of the distant position F2, and the near position N3 is located between the near position N2 and the distant position F2. Preferably, the near position N3 is located between the near position N1 and the distant position F2.

The focus control module 64 repeats the above-mentioned flow and generates N sets of the near position 92 and the distant position 93, and N sets of the contrast values 61 corresponding the N sets of the near position 92 and the distant position 93. N is a positive integer larger than 2. FIG. 7 illustrates the result of repeating three times, but the present disclosure is not limited thereto. In the above-mentioned flow, the first lens 20 is moved to the near positions N1~N3, and the second lens 30 is moved to the distant positions F1~F3, and the two lenses are moved for three times, respectively.

According to N sets of contrast values 61, the focus control module 64 controls the first lens driving module 70 and the second lens driving module 71, respectively, to drive the first lens 20 and the second lens 30 to perform the focusing. For example, the focus control module 64 can generate a contrast value curve 62 according to the N sets of contrast values 61, to obtain the focus position 63.

To sum up, the third embodiment of the auto-focus system performs focusing based on the contrast values, so this focusing approach of the third embodiment can also be applied to the second focus module of the first embodiment of the auto-focus system.

Figure 8:
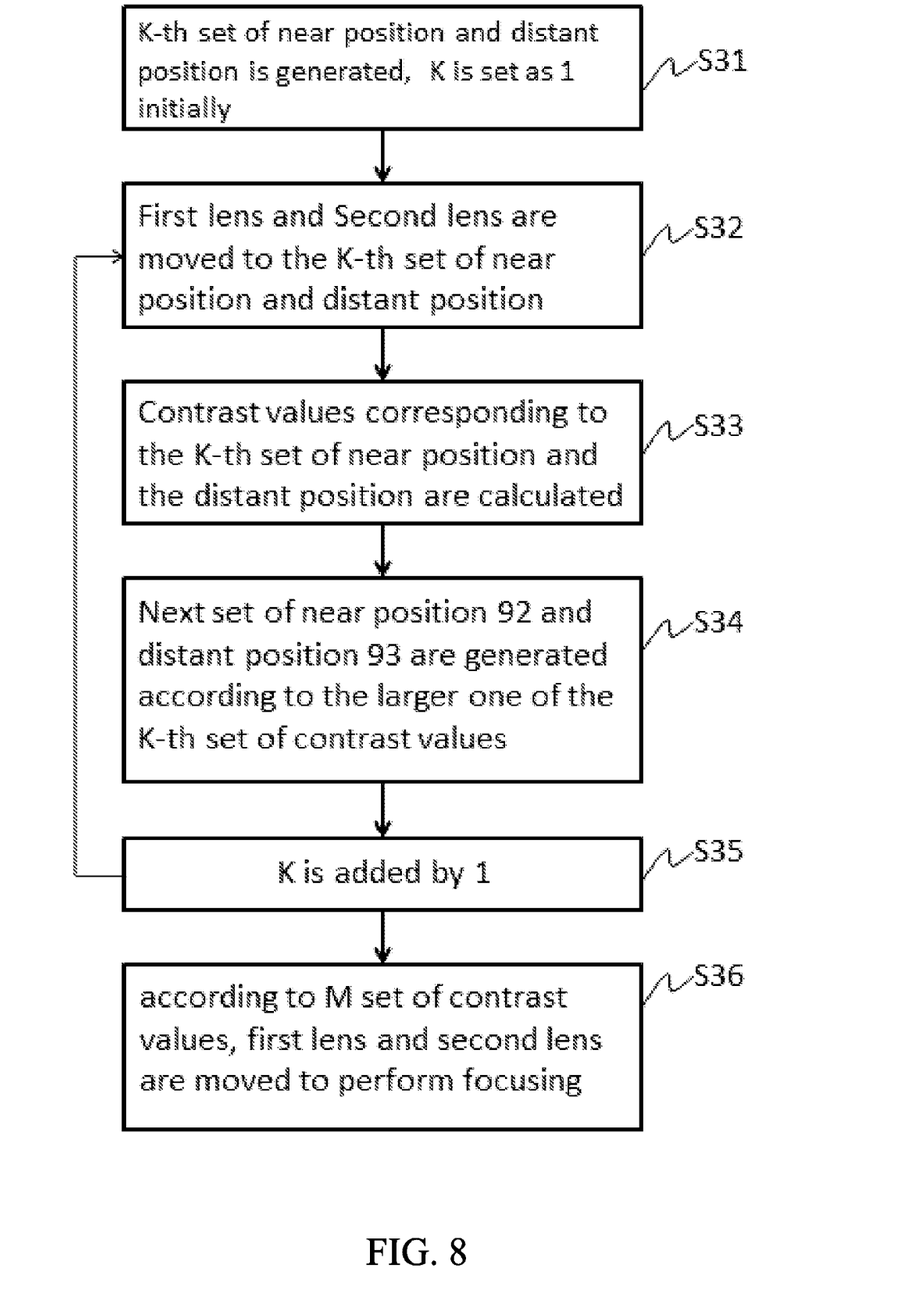
FIG. 8 is a flow diagram of a third embodiment of the auto-focus method using multiple lenses of the present disclosure.

Please refer to FIG. 8 which is a flow diagram of a third embodiment of the auto-focus method using multiple lenses of the present disclosure. The third embodiment is illustrated by cooperating with the FIG. 6. The auto-focus method comprises following steps. In step S31, a K-th set of a near position 92 and a distant position 93 is generated, the K is set as 1 initially.

In step S32, the first lens driving module 70 and the second lens driving module 71 are respectively controlled to drive the first lens 20 and the second lens 30 to move to the K-th set of the near position 92 and the distant position 93. In step S33, the contrast values 61 corresponding to the K-th set of the near position 92 and the distant position 93 are calculated.

In step S34, a next set of the near position 92 and the distant position 93 are generated according to the larger one of the K-th set of contrast values 61. The next set is indicative of the (K+1)th set. One of the (K+1)th set of the near position 92 or the distant position 93 is located between the K-th set of the near position 92 and the distant position 93. In step S35, K is added by 1.

The step S32 to step S35 are executed repeatedly to generate M sets of the near position 92 and the distant position 93, and corresponding M sets of the contrast values 61. M is a positive integer larger than 1. The M sets of the near position 92 and the distant position 93 is the same as the example shown in the FIG. 7, so detail description is omitted.

In step S36, according to M sets of the contrast values 61, the first lens driving module 70 and the second lens driving module 71 are controlled respectively to drive the first lens 20 and the second lens 30 to move to perform the focusing.

In implementation, the third embodiment of the auto-focus method further comprises a step of executing a contrast value calibration process, to maintain the consistency between the contrast values 61 of the first lens 20 or the second lens 30.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An auto-focus system using multiple lenses, adapted for an image capture device having a first lens, a second lens, a first lens driving module and a second lens driving module, and the auto-focus system comprising:

a repeated pattern detection module, configured for receiving a first image and a second image from the first lens and the second lens, respectively, and detecting whether a repeated pattern appears in a preset focus area of the first image and the second image;

a first focus module, configured for calculating a focus depth according to the first image and the second image when the repeated pattern detection module judges that the repeated pattern does not appear, and controlling the first lens driving module and the second lens driving module to drive movement of the first lens and the second lens for focusing; and a second focus module, configured for driving the first lens or the second lens to move for many times and calculating contrast values of the first image or the second image captured after each of movements when the repeated pattern detection module judges that the repeated pattern appears, and controlling the first lens driving module and the second lens driving module to drive movements of the first lens and the second lens for focusing according to the calculated contrast values.

2. The auto-focus system using multiple lenses according to claim 1, wherein the preset focus area is located at the central area of the first image and the second image.

3. The auto-focus system using multiple lenses according to claim 1, wherein the second focus module generates a contrast value curve according to the plurality of contrast values, and the position corresponding to the maximum value in the contrast value curve is used as a focus position, and the second focus module moves the first lens and the second lens to the focus position for focusing.

4. An auto-focus system using multiple lenses, adapted for an image capture device having a first lens, a second lens, a first lens driving module and a second lens driving module, and the auto-focus system comprising:

a depth calculation module, configured for receiving a first image and a second image from the first lens and the second lens, respectively, and calculating a focus depth or a plurality of candidate depths according to a preset focus area in the first image and the second image;

a focus control module, electrically connected with the depth calculation module, wherein when the depth calculation module outputs the focus depth, the focus control module activates the first lens driving module and the second lens driving module to respectively control the first lens and the second lens to move to a position corresponding to the focus depth;

wherein when the depth calculation module outputs the plurality of candidate depths, the focus control module respectively controls the first lens driving module and the second lens driving module to drive the first lens or the second lens to move to a plurality of candidate focus positions corresponding to the plurality of candidate depths, and the focus control module obtains a plurality of contrast values and according to the plurality of contrast values drives the movements of the first lens and the second lens for focusing.

5. The auto-focus system using multiple lenses according to claim 4, wherein the preset focus area is located at the central area of the first image and the second image.

6. The auto-focus system using multiple lenses according to claim 4, wherein the depth calculation module generates the plurality of candidate depths firstly, and each of the plurality of candidate depths has a reliability value, and the depth calculation module determines the focus depth from the plurality of candidate depths according to a reliability judgment condition.

7. The auto-focus system using multiple lenses according to claim 6, wherein when the depth calculation module cannot determine the focus depth according to the reliability judgment condition, the depth calculation module outputs the plurality of candidate depths.

8. An auto-focus method using multiple lens, adapted for an image capture device having a first lens, a second lens, a first lens driving module and a second lens driving module, and the auto-focus method comprising:

(a) using the first lens and the second lens to capture a first image and a second image, respectively;

(b) judging whether a repeated pattern appears in a preset focus area of the first image and the second image;

(c) calculating a depth according to the first image and the second image and respectively controlling the first lens driving module and the second lens driving module to drive movements of the first lens and the second lens for focusing when it is judged that the repeated pattern does not appear; and (d) driving the first lens or the second lens to move for many times and calculating contrast values of the first image or the second image captured after each of movements, and according to the calculated contrast values respectively controlling the first lens driving module and the second lens driving module to drive movements of the first lens and the second lens for focusing when it is judged that the repeated pattern appears.

9. The auto-focus method using multiple lens according to claim 8, wherein when it is judged that the repeated pattern appears, the step (d) further comprises steps of:

generating a contrast value curve according to the plurality of contrast values;

using the position corresponding to the maximum value in the contrast value curve as a focus position; and driving the first lens and the second lens to move to the focus position for focusing.

10. An auto-focus method using multiple lens, adapted for an image capture device having a first lens, a second lens, a first lens driving module and a second lens driving module, and the auto-focus method comprising:

using the first lens and the second lens to capture a first image and a second image, respectively;

generating a plurality of candidate depths according to a preset focus area of the first image and the second image, each of the plurality of candidate depths having a reliability value;

determining a focus depth from the plurality of candidate depths according to a reliability judgment condition and the plurality of reliability values;

controlling the first lens driving module and the second lens driving module to respectively drive the first lens and the second lens to move to a position corresponding to the focus depth when the focus depth is determined;

controlling the first lens driving module and the second lens driving module to respectively drive the first lens or the second lens to move to positions corresponding to the plurality of candidate depths, and respectively obtaining a plurality of contrast values, and driving the first lens and the second lens to move to a position corresponding to the candidate depth having the maximal contrast value in the plurality of candidate depths when the focus depth cannot be determined.

\* \* \* \* \*